(12) United States Patent
Tucker et al.

(10) Patent No.: US 11,358,156 B1
(45) Date of Patent: Jun. 14, 2022

(54) DUAL CONNECTION CYCLONIC OVERHEAD SEPARATOR

(71) Applicant: VACUUM TECHNOLOGIES, LLC, Sheridan, WY (US)

(72) Inventors: John F. Tucker, Sheridan, WY (US); Eldered F. Tucker, Jr., Sheridan, WY (US); Steve W. Lieneman, Sheridan, WY (US); Jesse G. Ford, Sheridan, WY (US); Jeremy S. Van Buskirk, Sheridan, WY (US); Dennis A. Gresham, Sheridan, WY (US); Clay D. Price, Sheridan, WY (US)

(73) Assignee: VACUUM TECHNOLOGIES, LLC, Sheridan, WY (US)

( * ) Notice: Subject to any disclaimer, the term of this patent is extended or adjusted under 35 U.S.C. 154(b) by 18 days.

(21) Appl. No.: 16/869,256

(22) Filed: May 7, 2020

Related U.S. Application Data

(60) Provisional application No. 62/846,398, filed on May 10, 2019.

(51) Int. Cl.
| | |
|---|---|
| *B04C 5/02* | (2006.01) |
| *B04C 5/081* | (2006.01) |
| *B04C 5/14* | (2006.01) |
| *B04C 5/12* | (2006.01) |
| *B01D 45/12* | (2006.01) |
| *A47L 9/16* | (2006.01) |

(52) U.S. Cl.
CPC ............... *B04C 5/02* (2013.01); *A47L 9/165* (2013.01); *A47L 9/1683* (2013.01); *B01D 45/12* (2013.01); *B04C 5/081* (2013.01); *B04C 5/12* (2013.01); *B04C 5/14* (2013.01)

(58) Field of Classification Search
CPC .. B04C 5/02; B04C 5/081; B04C 5/12; B04C 5/14; B04C 5/04; B01D 45/12; B01D 45/16; A47L 9/165; A47L 9/1608; A47L 9/1683
See application file for complete search history.

(56) References Cited

U.S. PATENT DOCUMENTS

| | | | |
|---|---|---|---|
| 8,146,201 B2 | 4/2012 | Conrad | |
| 8,806,707 B2 * | 8/2014 | Soen | B01D 45/16 55/459.3 |
| 11,206,964 B2 * | 12/2021 | Hwang | A47L 9/1641 |

(Continued)

FOREIGN PATENT DOCUMENTS

| | | |
|---|---|---|
| KR | 101451020 B1 | 10/2014 |
| WO | 2010020155 A1 | 2/2010 |

*Primary Examiner* — Robert Clemente
(74) *Attorney, Agent, or Firm* — Nyemaster Goode, P.C.

(57) ABSTRACT

A vacuum cyclonic separator that includes: a main body having a top surface with an air outlet, a bottom perimeter defining a bottom aperture of the main body, at least two downwardly facing air inlets and at least one side wall extending between the top surface and the bottom portion and shaped such that air received within an interior cavity of main body moves in a cyclone and wherein the at least two downwardly facing air inlets are in at least substantially the same plane as the bottom perimeter of the main body; and a dump valve assembly capable of being opened and closed with one hand where the dump valve is engaged with the bottom portion to seal the bottom aperture of the main body.

20 Claims, 18 Drawing Sheets

(56) References Cited

U.S. PATENT DOCUMENTS

| | | | |
|---|---|---|---|
| 2002/0189048 A1* | 12/2002 | Maruyama | A47L 9/165 15/344 |
| 2003/0163887 A1* | 9/2003 | Inoue | A47L 9/165 15/353 |
| 2003/0221280 A1* | 12/2003 | Oh | A47L 9/327 15/353 |
| 2004/0010885 A1* | 1/2004 | Hitzelberger | A47L 9/165 15/352 |
| 2005/0223519 A1* | 10/2005 | Greene | A47L 9/122 15/353 |
| 2005/0223520 A1* | 10/2005 | Greene | A47L 9/1666 15/353 |
| 2005/0229355 A1* | 10/2005 | Crouch | A47L 9/1683 15/352 |
| 2006/0090428 A1* | 5/2006 | Park | B04C 5/185 15/353 |
| 2007/0234687 A1 | 10/2007 | Ni | |
| 2007/0289089 A1* | 12/2007 | Yacobi | B04C 5/12 15/353 |
| 2009/0265883 A1* | 10/2009 | Reed, Jr. | A47L 9/1608 15/353 |
| 2009/0305862 A1* | 12/2009 | Yoo | A47L 9/1666 494/36 |
| 2010/0175219 A1* | 7/2010 | Soen | A47L 9/165 15/353 |
| 2010/0205916 A1* | 8/2010 | Yoo | A47L 9/1608 55/318 |
| 2012/0222253 A1* | 9/2012 | Conrad | A47L 9/1608 15/347 |
| 2012/0222254 A1* | 9/2012 | Conrad | A47L 9/1683 15/347 |
| 2012/0222258 A1* | 9/2012 | Conrad | A47L 9/1608 15/347 |
| 2013/0269147 A1* | 10/2013 | Conrad | A47L 9/322 15/329 |
| 2014/0137363 A1* | 5/2014 | Wilson | A47L 9/106 15/347 |
| 2014/0237757 A1* | 8/2014 | Conrad | A47L 5/24 15/353 |
| 2017/0290479 A1* | 10/2017 | Conrad | A47L 5/225 |
| 2018/0177365 A1* | 6/2018 | Conrad | B65F 1/14 |
| 2019/0254494 A1* | 8/2019 | Hyun | A47L 9/1608 |
| 2019/0274503 A1* | 9/2019 | Hyun | A47L 9/1683 |
| 2019/0298128 A1* | 10/2019 | Conrad | B04C 5/185 |
| 2019/0298129 A1* | 10/2019 | Conrad | A47L 9/1683 |
| 2019/0298130 A1* | 10/2019 | Conrad | A47L 9/1666 |

* cited by examiner

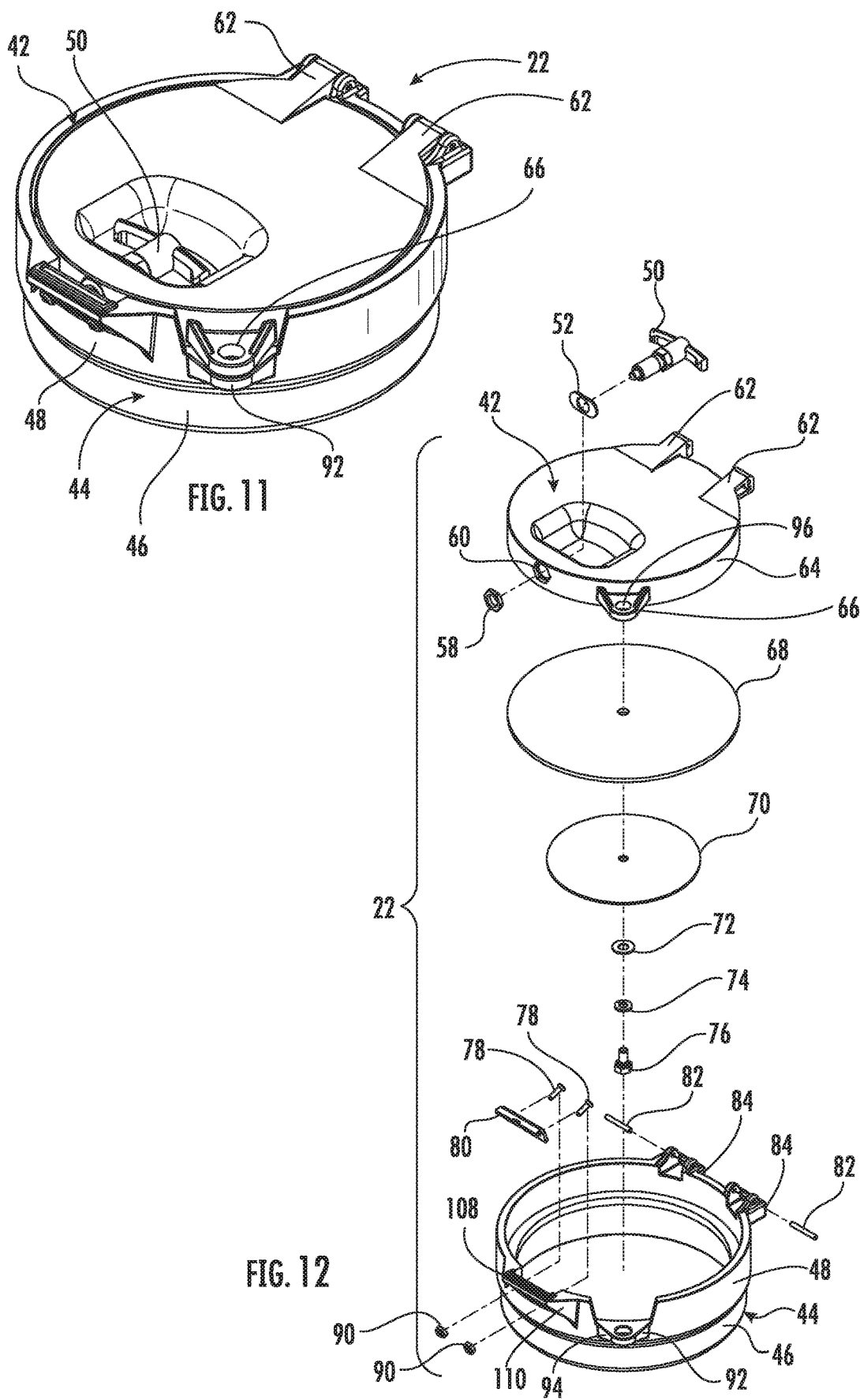

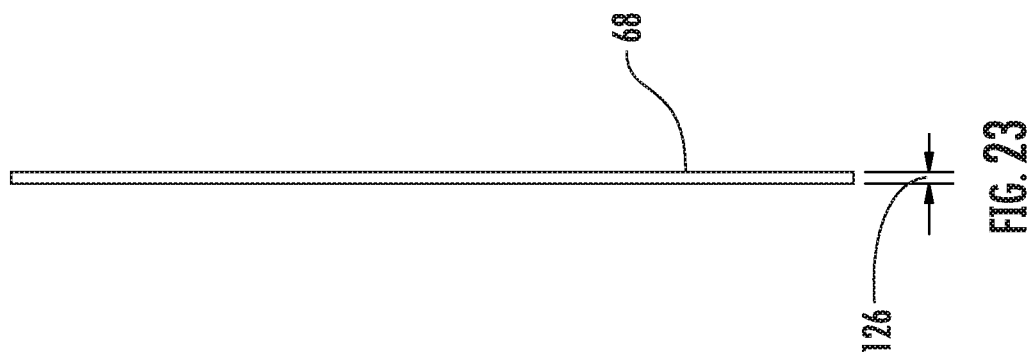
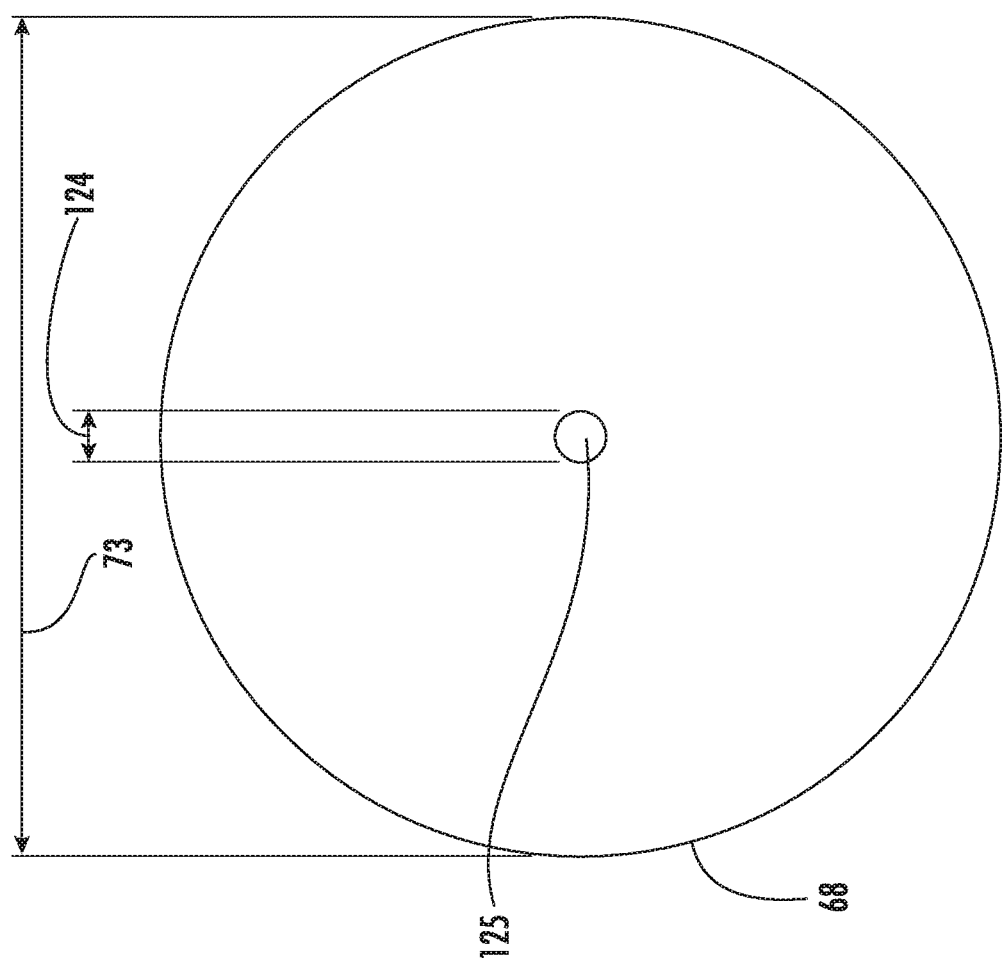

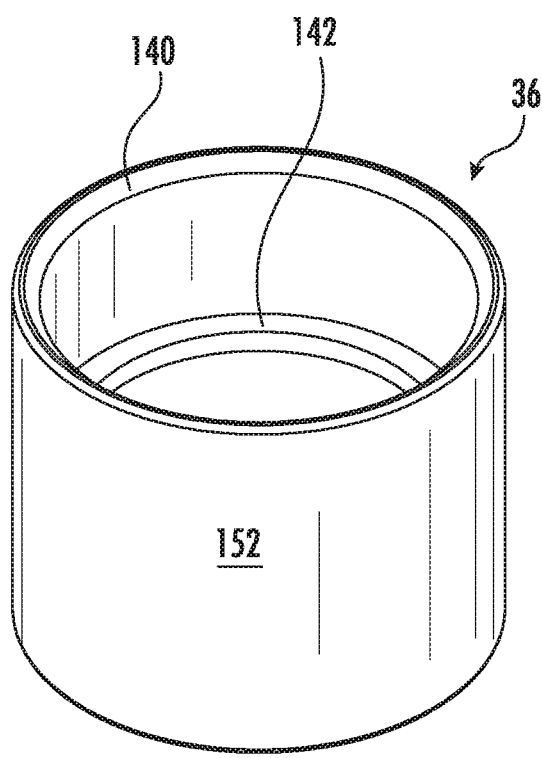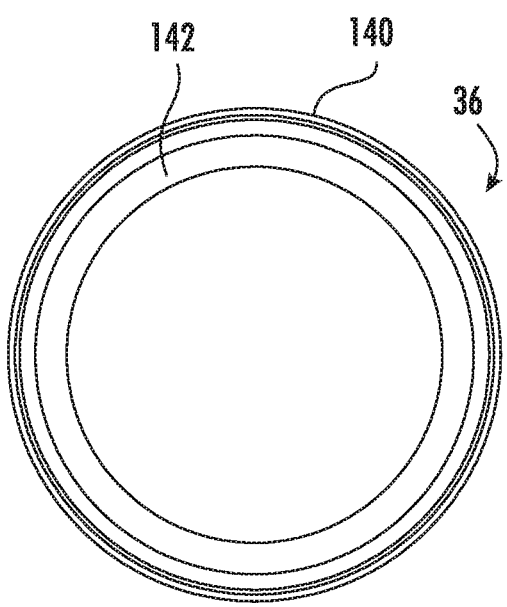
FIG. 32  FIG. 33
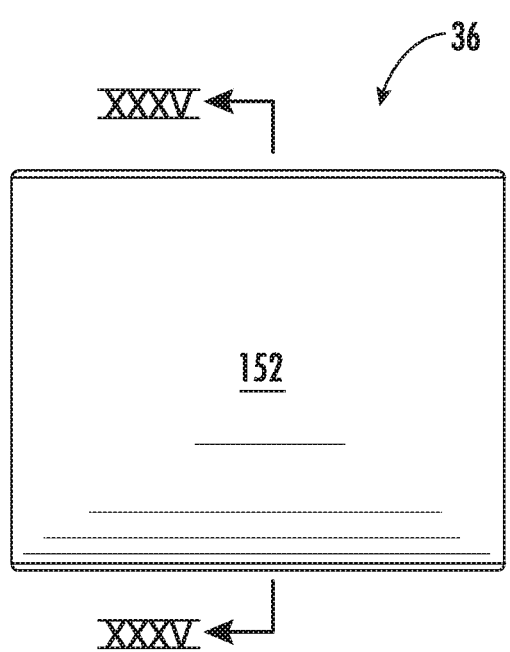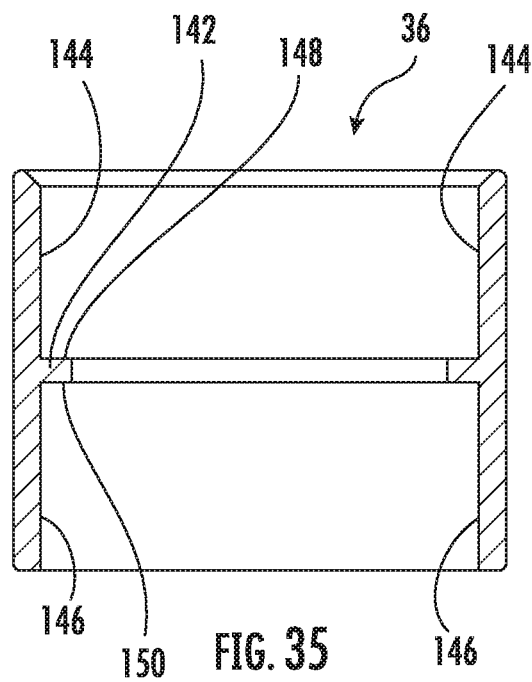
FIG. 34  FIG. 35

DUAL CONNECTION CYCLONIC OVERHEAD SEPARATOR

CROSS-REFERENCE TO RELATED APPLICATION

This application claims benefit of and priority to U.S. Ser. No. 62/846,398, filed on May 10, 2019, entitled "DUAL CONNECTION CYCLONIC OVERHEAD SEPARATOR," the disclosure of which is hereby incorporated herein by reference in its entirety.

FIELD OF THE DISCLOSURE

The present disclosure generally relates to vacuum technologies; in particular, a cyclonic vacuum separator having a plurality of intake apertures that receive gas (air) and debris.

SUMMARY

An aspect of the present disclosure includes a vacuum cyclonic separator including a main body having a top surface with an air outlet, a bottom perimeter defining a bottom aperture of the main body, at least two downwardly facing air inlets and at least one side wall extending between the top surface and the bottom portion and shaped such that air received within an interior cavity of the main body moves in a cyclone and wherein the at least two downwardly facing air inlets are in at least substantially the same plane as the bottom perimeter of the main body; and a dump valve assembly capable of being opened and closed with one hand where the dump valve is engaged with the bottom portion to seal the bottom aperture of the main body.

Another aspect of the present disclosure includes a main body having a top surface with an air outlet, a bottom perimeter defining a bottom aperture of the main body, at least two downwardly facing air inlets and at least one side wall extending between the top surface and the bottom portion and shaped such that air received within an interior cavity of the main body moves in a cyclone and wherein the at least two downwardly facing air inlets are in at least substantially the same plane as the bottom perimeter of the main body; a dump valve assembly capable of being opened and closed with one hand where the dump valve is engaged with the bottom portion to seal the bottom aperture of the main body; and an air discharge assembly engaged to the air outlet of the main body such that the air discharge assembly routes air from within the interior cavity of the main body outside of the vacuum cyclonic separator and into a discharge conduit or open air above the vacuum cyclonic separator.

Yet another aspect of the present disclosure includes a method of vacuuming an interior surface of a vehicle that includes the steps of: using a vacuum cyclonic separator to vacuum particles of different density into a vacuum cyclonic separator that comprises a main body having a top surface with an air outlet, a bottom perimeter defining a bottom aperture of the main body, at least two downwardly facing air inlets and at least one side wall extending between the top surface and the bottom portion and shaped such that air received within an interior cavity of the main body moves in a cyclone and wherein the at least two downwardly facing air inlets are in at least substantially the same plane as the bottom perimeter of the main body; and a dump valve assembly capable of being opened and closed with one hand where the dump valve is engaged with the bottom portion to seal the bottom aperture of the main body; causing the particles to move within the interior cavity of the main body such that particles of a given density or higher fall to a bottom of the interior cavity and are collected therein forming collected particles; and releasing the collected particles by opening a lid of the dump valve assembly. The method may also optionally include the step of mounting the vacuum cyclonic separator in an elevated position above the surface of a vehicle being vacuumed by a user.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 11 is a perspective view of a single-hand openable dump valve of the present disclosure.

FIG. 12 is an exploded view of the single-hand openable dump valve according to an aspect of the present disclosure shown in FIG. 11.

FIG. 22 is a top view of the gasket retaining plate according to the present disclosure.

FIG. 23 is a side view of the gasket retaining plate shown in FIG. 22.

FIG. 32 is a perspective view of a chamfered discharge pipe coupler according to the present disclosure.

FIG. 33 is a top view of the chamfered discharge pipe coupler shown in FIG. 32.

FIG. 34 is an elevated front view of the chamfered discharge pipe coupler shown in FIG. 32.

FIG. 35 is a cross-section of the chamfered discharge pipe coupler taken along line XXXV-XXXV in FIG. 34.

DETAILED DESCRIPTION OF EMBODIMENTS

Figures 2A, 2B:
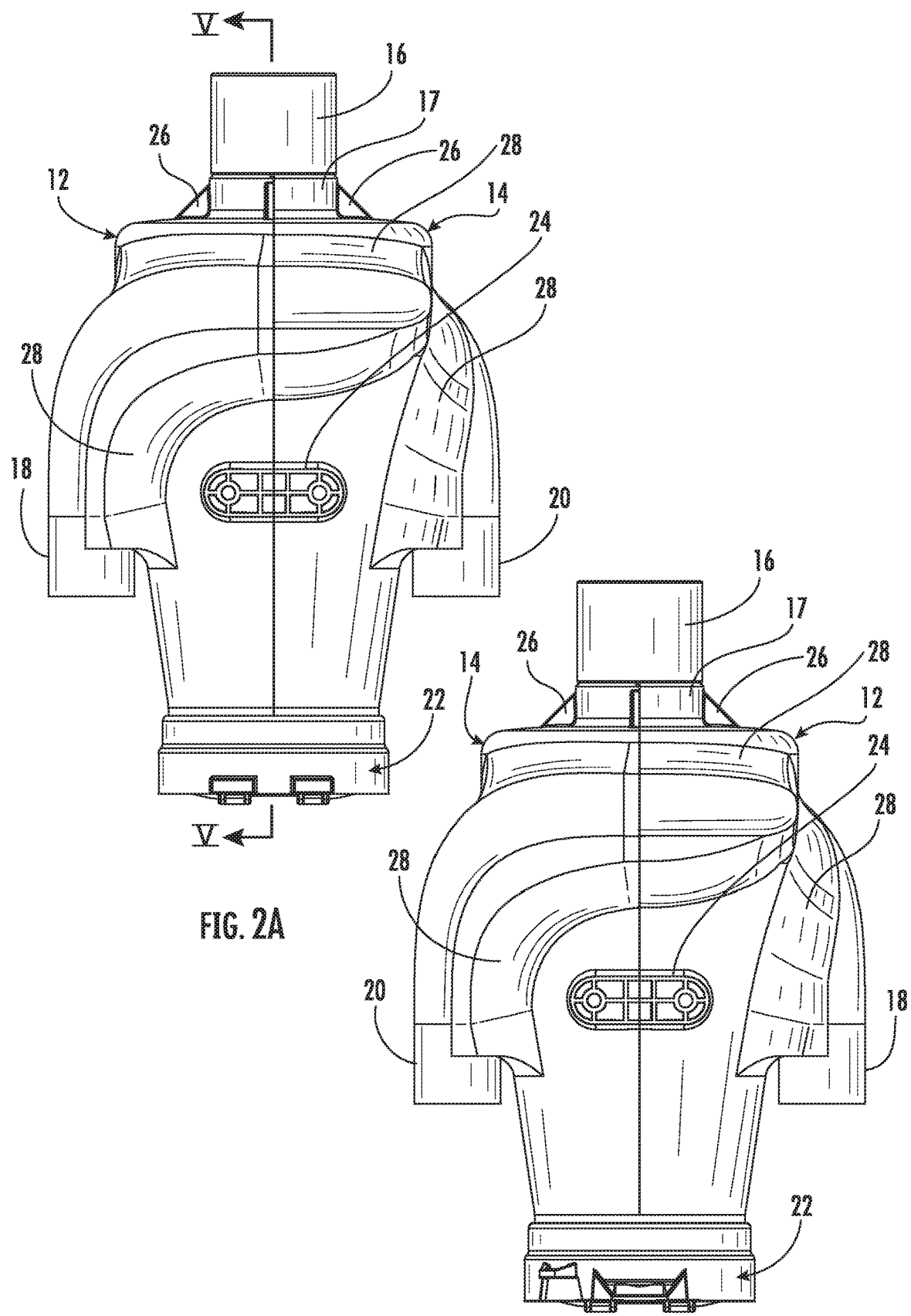
FIG. 2A is an elevated back view of a cyclonic vacuum separator shown in FIG. 1.
FIG. 2B is an elevated front view of a cyclonic vacuum separator shown in FIG. 1.
Figure 3:
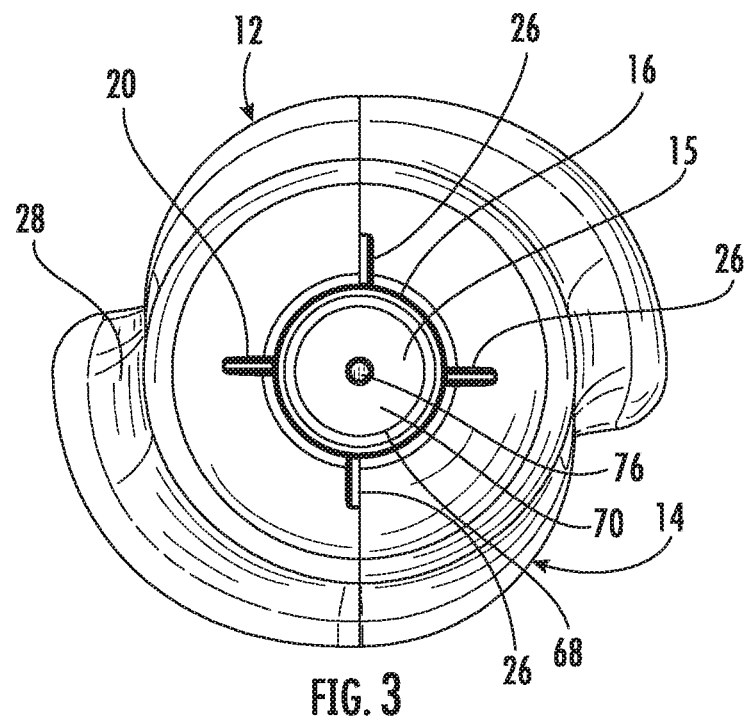
FIG. 3 is a top view of the cyclonic vacuum separator shown in FIG. 1.
Figure 4:
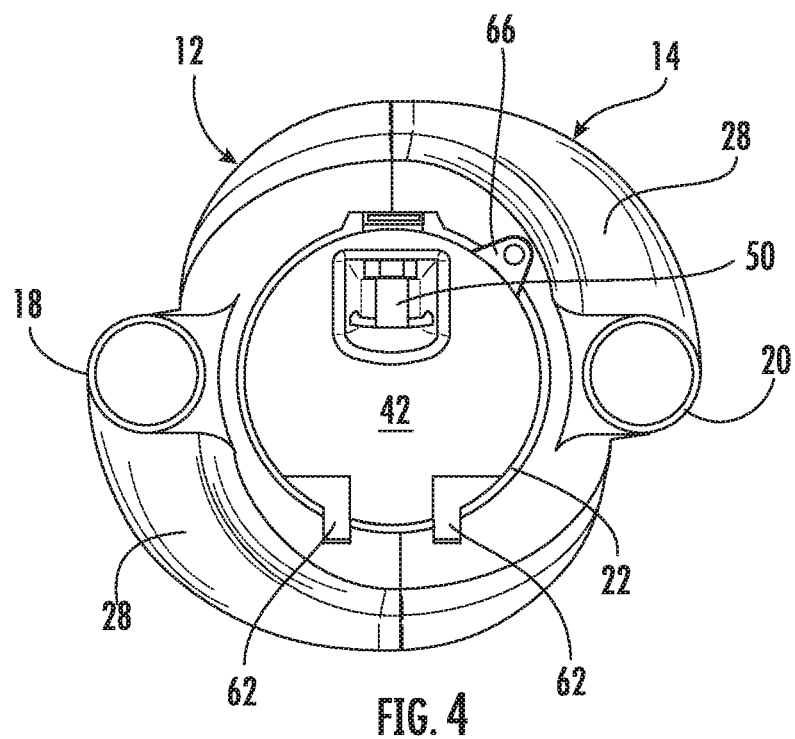
FIG. 4 is a bottom view of the cyclonic vacuum separator shown in FIG. 1.

For purposes of description herein, the terms "upper," "lower," "right," "left," "rear," "front," "vertical," "horizontal," and derivatives thereof shall relate to the invention as oriented in FIG. 2B. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

In this specification and the appended claims, the singular forms "a," "an" and "the" include plural reference unless the context clearly dictates otherwise.

"Consisting essentially of" in the context of the claims of this application limits the scope of a claim or claim element to the specified materials or steps "and those that do not materially affect the basic and novel characteristic(s)" of the claimed invention as would be known by those of ordinary skill in the art whether or not such a composition is disclosed in the application or not as affecting the basic and novel characteristic.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the Applicant intends to indicate "only A or B but not both" then the term "only A or B but not both" will be employed. Thus, use of the term "or" herein is the inclusive, and not the exclusive use. Also, to the extent that the terms "in" or "into" are used in the specification or the claims, it is intended to additionally mean "on" or "onto."

The present disclosure generally is directed toward a cyclonic vacuum separator system. The cyclonic vacuum separator systems of the present disclosure are often suspended above the user in a vehicle interior vacuuming bay or another location where a vacuum is necessary or would be helpful. Generally speaking, cyclonic separation is a method of removing particles from, in the case of the present disclosure air or gas, typically without the use of filters, through a vortex (cyclone) separation process. Conceivably, a system designed in accordance with the present disclosure might also be used with a liquid stream, but that would not typically be the case. When removing particulate matter from a gas (including air), a gas cyclone or vortex is employed. Rotational effects and gravity are used to separate mixtures of solids and fluids (gas/air or possibly liquid). A high speed rotating airflow is established within a cylindrical or conical container. The high speed rotating air is typically called a cyclone. Air flows in a helical pattern beginning at the top (typically the wide end) of the cyclone and ending at the bottom before exiting the cyclone in a straight stream through the center of the cyclone and out the top of the cyclonic separator. Larger (denser) particles in the rotating stream have too much inertia to follow the tight curve of the stream. Thereafter, these particles strike the outside wall and fall to the bottom of the cyclone where they can be removed. As the rotating flow moves toward the narrow end of the cyclone, the rotational radius of the stream shrinks. This separates smaller and smaller particles. Generally speaking, the geometry of the cyclone, as well as the volumetric flow rate, define a "cut point" for the cyclone, which is the size of a particle that will be removed from the stream with an efficiency of about 50%. Particles larger than the cut point will be removed with greater efficiency and smaller particles are typically removed at lower efficiency as they are more difficult to separate.

Figure 1:
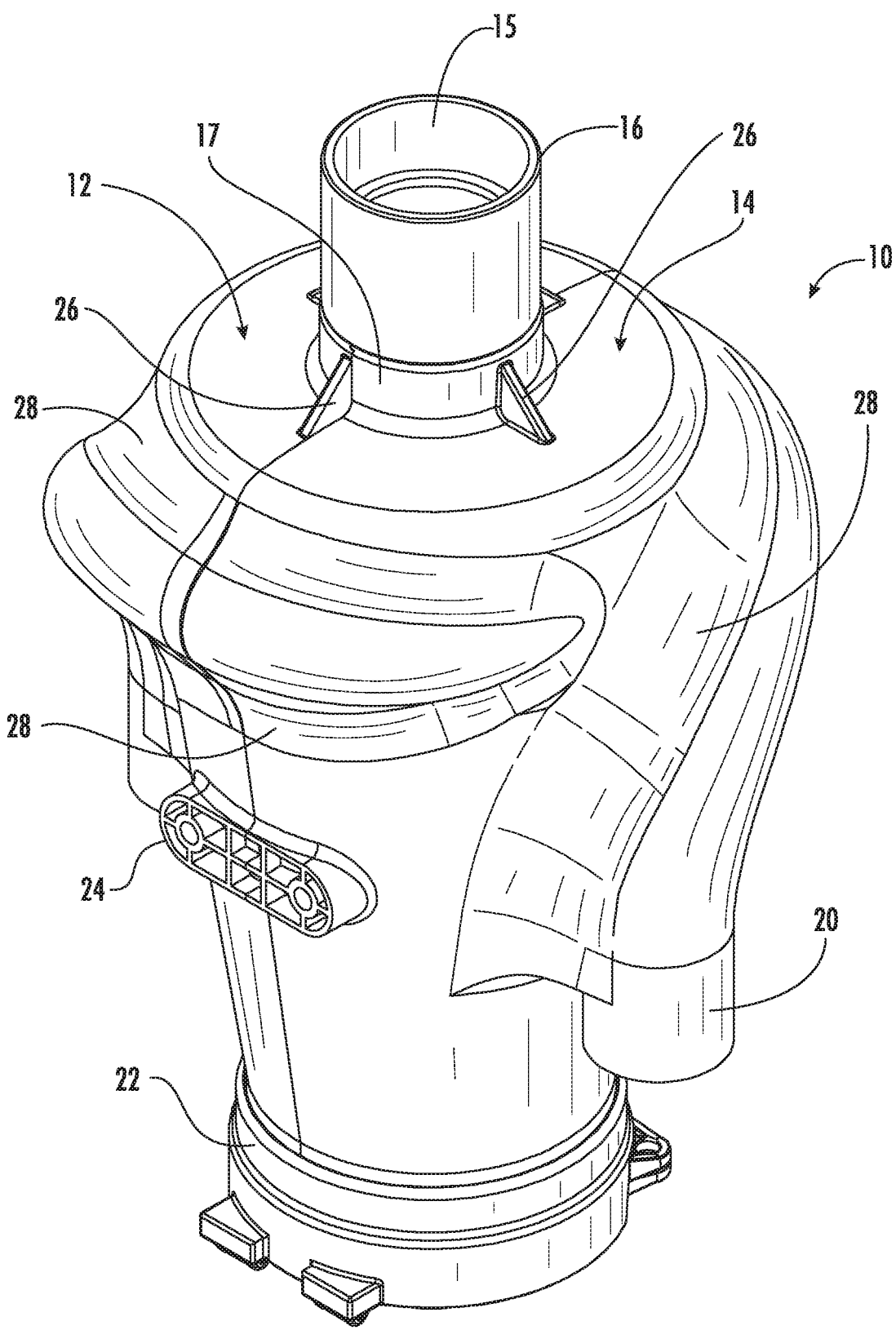
FIG. 1 is an upper left perspective view of the back of a cyclonic vacuum separator according to an aspect of the present disclosure.

The cyclonic vacuum separator 10 of the present disclosure is shown in FIG. 1, which is a modular vacuum system that separates a main vacuum line into at least two separate vacuum intakes while providing simultaneous cyclonic vacuum separator function to both intakes. The vacuum system is typically positioned remote from the cyclonic vacuum separator. The cyclonic vacuum separator 10 may be used in a variety of applications, but is presently contemplated to be used in connection with one or more car wash vacuum systems such as those present in commercial vehicle wash environments or in a residential garage. Most typically, the separator 10 will be used in commercial vehicle wash environments, in particular suspended above a user on one or two sides of a vehicle vacuuming bay/system where the vehicle is parked in the center and typically one or a plurality of cyclonic separators are suspended on the left, right or left and right of the vehicle being vacuumed.

The vehicle vacuum bay may also employ one or a plurality of cyclonic vacuum separators on one or more tracks above the vehicle to enable the user to move the cyclonic vacuum separator(s) around the vehicle to different locations selected by the user.

The cyclonic separator 10 of the present disclosure is uniquely constructed to allow the system to be suspended above the operator and/or above the vehicles being cleaned. One or more of the systems may be mounted within a given car wash facility and suspended from a ceiling or other overhang such that vacuum hoses (not shown, but that connect to first downward facing inlet 18 and second downward facing inlet 20) are easily accessible by users wishing to clean their vehicle. As discussed above, the cyclonic separator systems of the present disclosure allow larger (more dense) particles that may inadvertently be vacuumed by the user of the system to be captured and recovered without loss while still removing smaller particles such as dirt and crumbs. Significantly, these systems, when employed in connection with a larger vacuum line providing the vacuum air moving, prevents the main vacuum line (not shown) connected to the air discharge assembly 16 from clogging or being damaged and also lessens the amount of maintenance and repair necessary for those main vacuum lines. The main vacuum line for a series of vehicle vacuum bays may connect to a plurality, typically at least two, more typically more than two and most typically 6 or more cyclonic separator systems where at least one of the cyclonic separators systems are associated with each vehicle vacuum bay or location as discussed previously. The system's ability to be elevated above a user's head has many unique benefits that include the ability to remove hoses and vacuum systems from the work surface and have them up and out of the way of workers below. Additionally, the system being positioned elevated helps with the cleanliness of the vacuum lines connected to the inlets of the systems, keeps debris from being clogged in the vacuum lines connected to the first downward facing inlet 18 and second downward facing inlet 20 and keeps the vacuum lines (not shown) from being worn by rubbing on the ground or other surfaces. The vacuum lines are typically hollow tubes with flexibility that are typically made from a plastic polymer, but conceivably may be at least partially constructed of metal. Because the hoses used to contact the surface being cleaned are up and off the surface of the vehicle wash facility, they are cleaner and do not deposit dirt or other debris that might be on the exterior of the hose within the vehicle being cleaned.

Figure 5A:
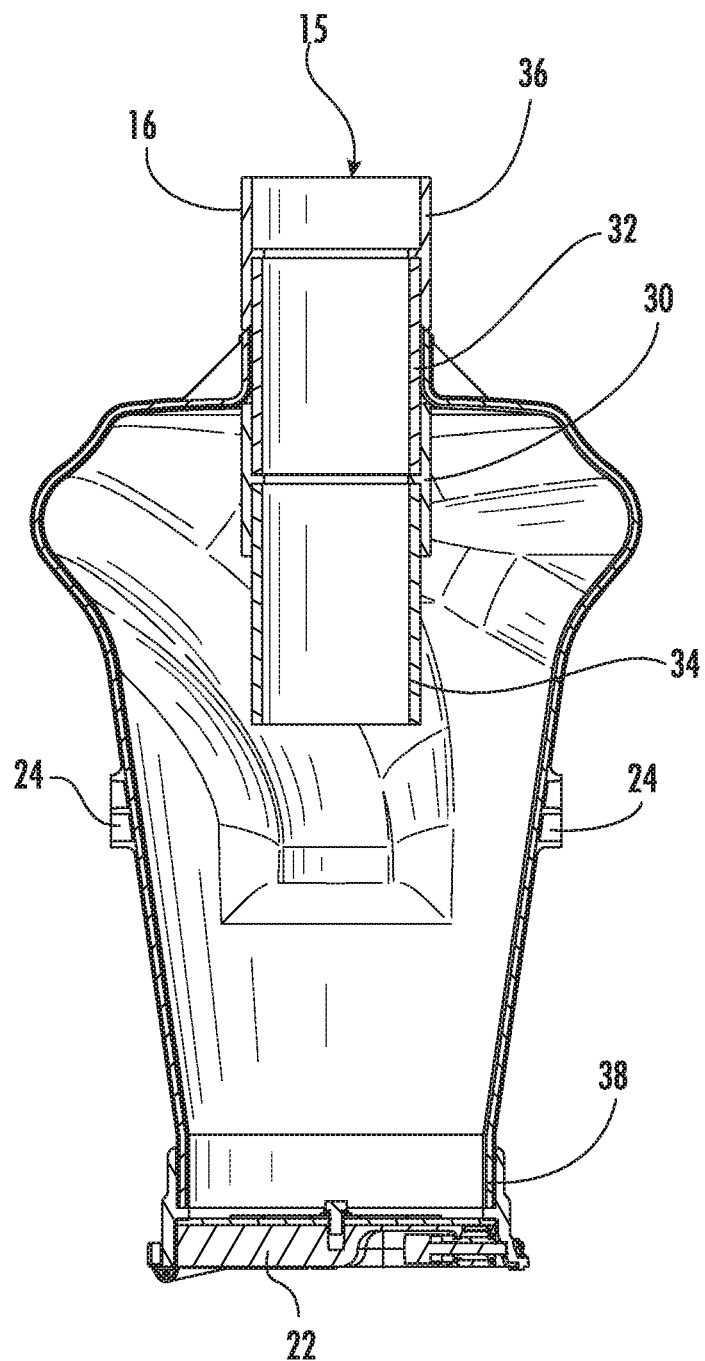
FIG. 5A is a cross-sectional view of the cyclonic vacuum separator of FIG. 1 taken along lines V-V in FIG. 2A.
Figure 5B:
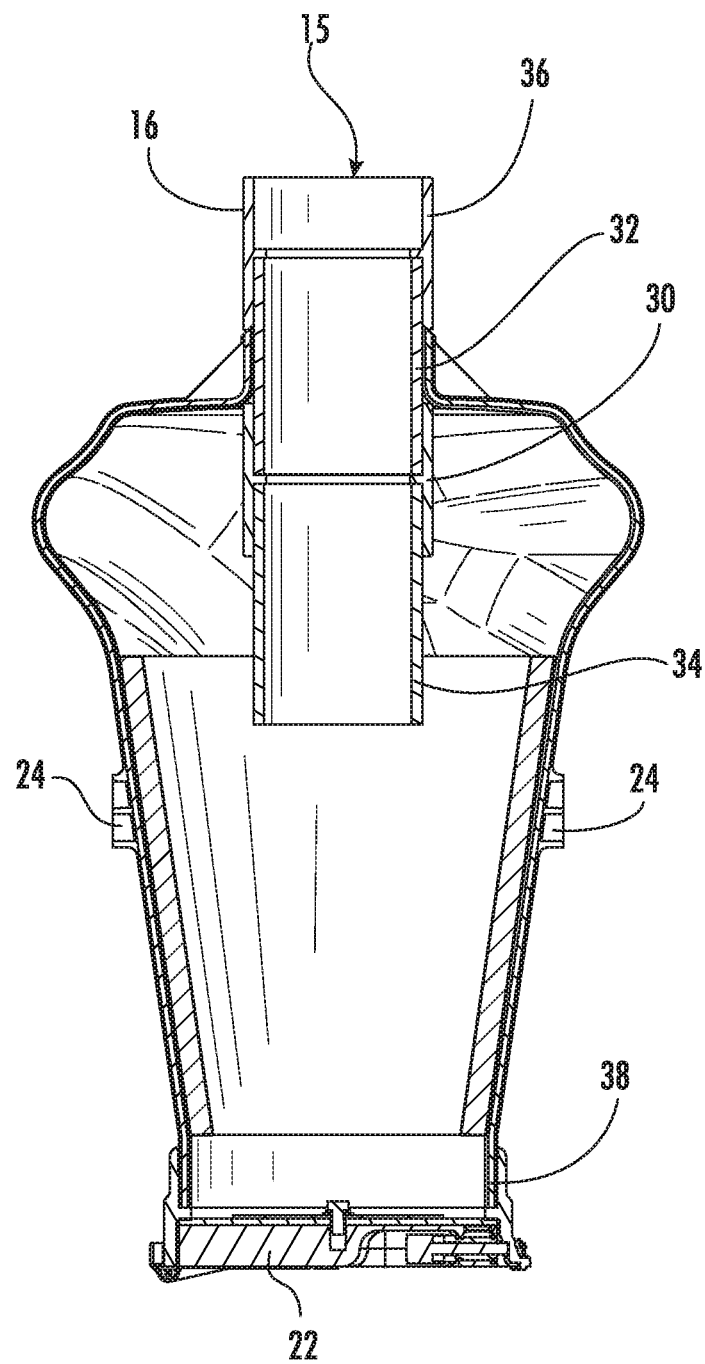
FIG. 5B is a cross section view of the cyclonic separator of FIG. 1 taken along lines V-V in FIG. 2A, but employing an optional conical debris separator.
Figure 6:
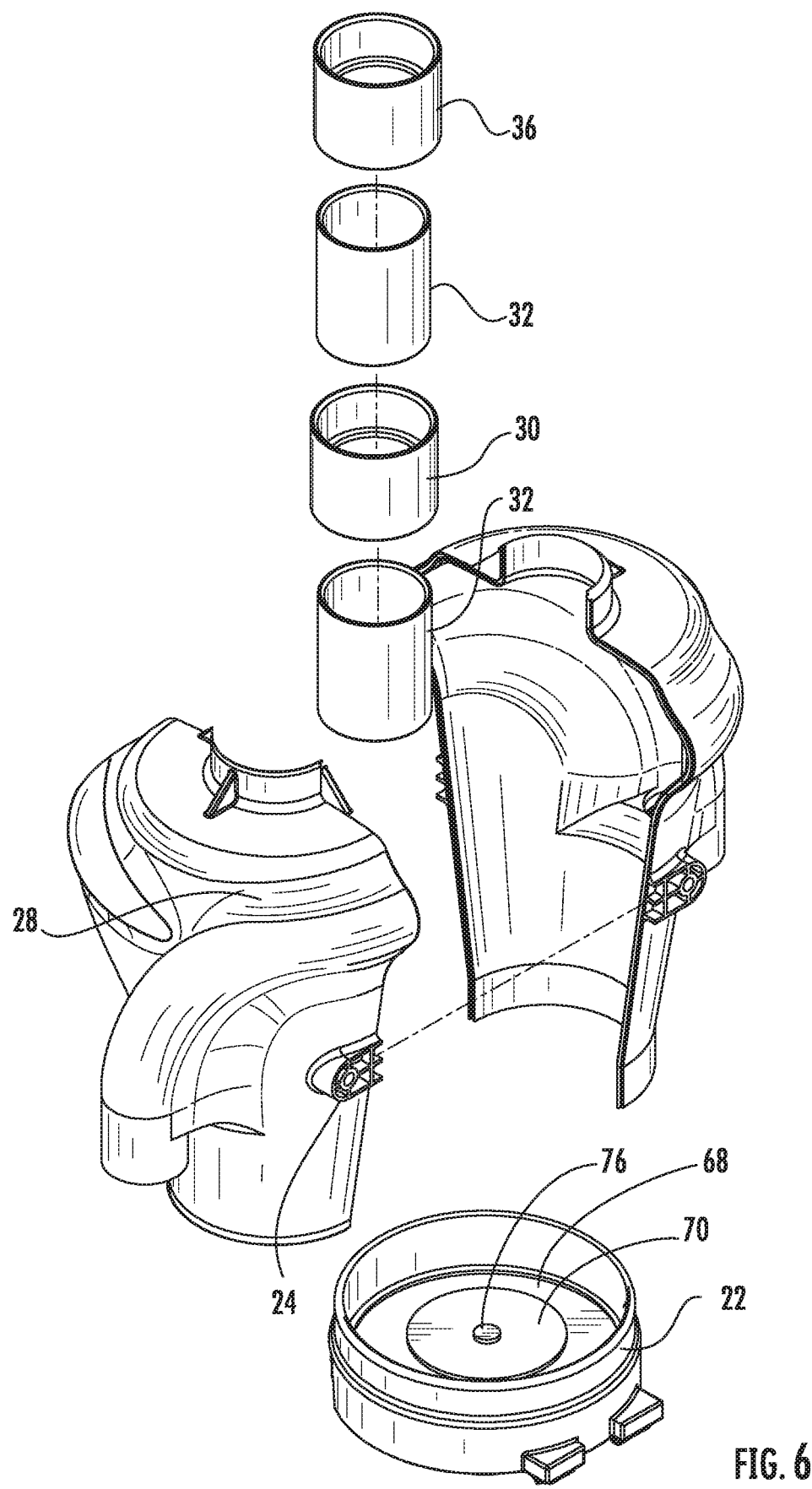
FIG. 6 is an exploded view of the cyclonic vacuum separator shown in FIG. 1.
Figure 7:
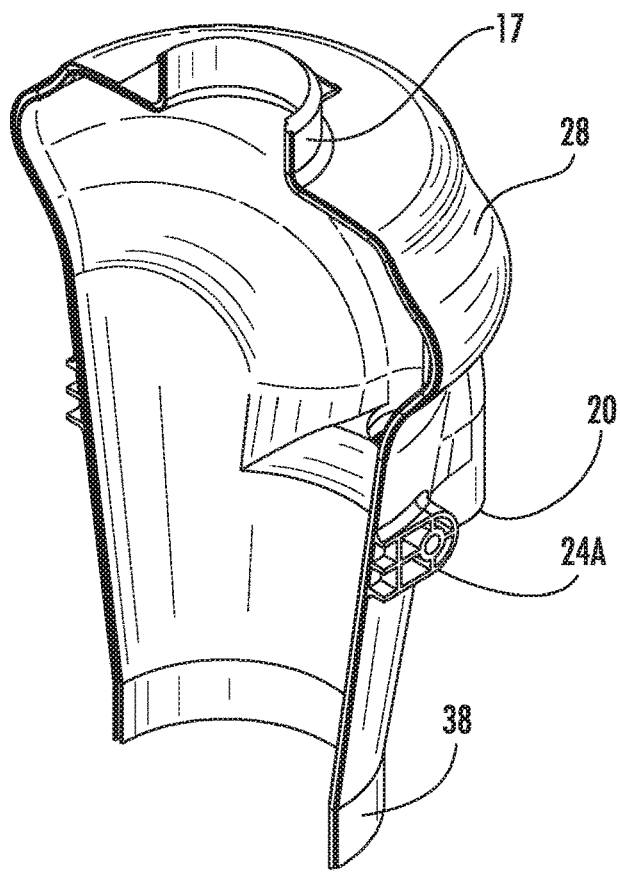
FIG. 7 is a perspective view of one half of the main body of a cyclonic separator according to an aspect of the present disclosure.
Figure 8:
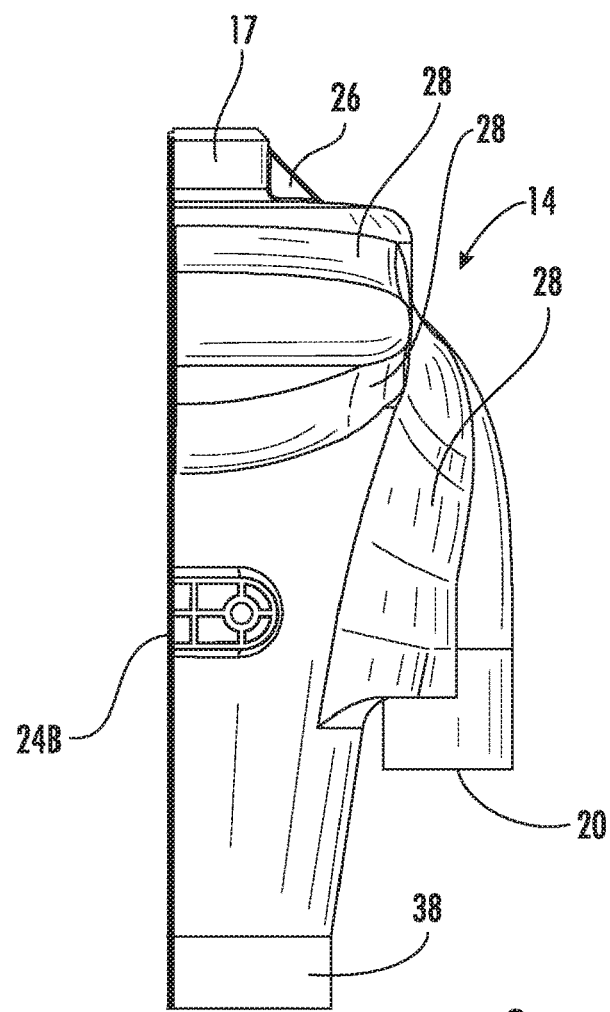
FIG. 8 is a front view of the half section of the main body of the cyclonic separator shown in FIG. 7.
Figure 9:
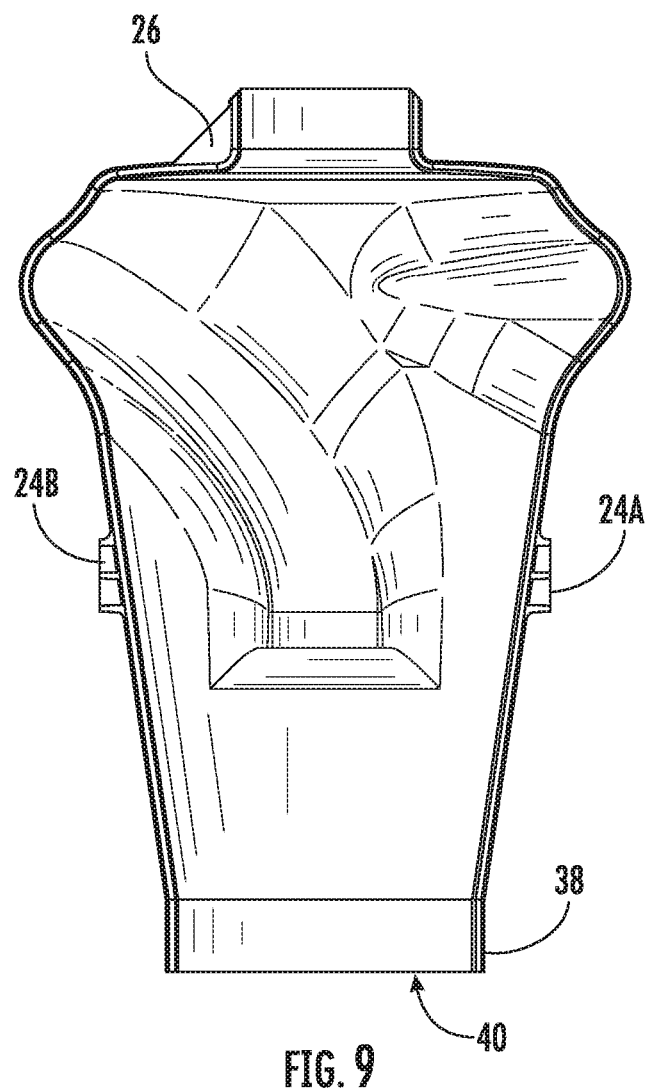
FIG. 9 is an elevated interior view of the half section of the main body of the cyclonic separator of FIG. 7.
Figure 10:
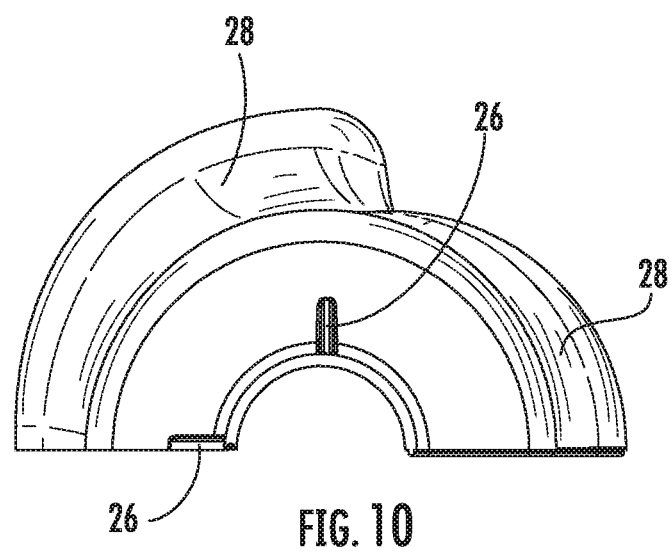
FIG. 10 is a top view of the half of the cyclonic separator shown in FIG. 7.
Figure 13:
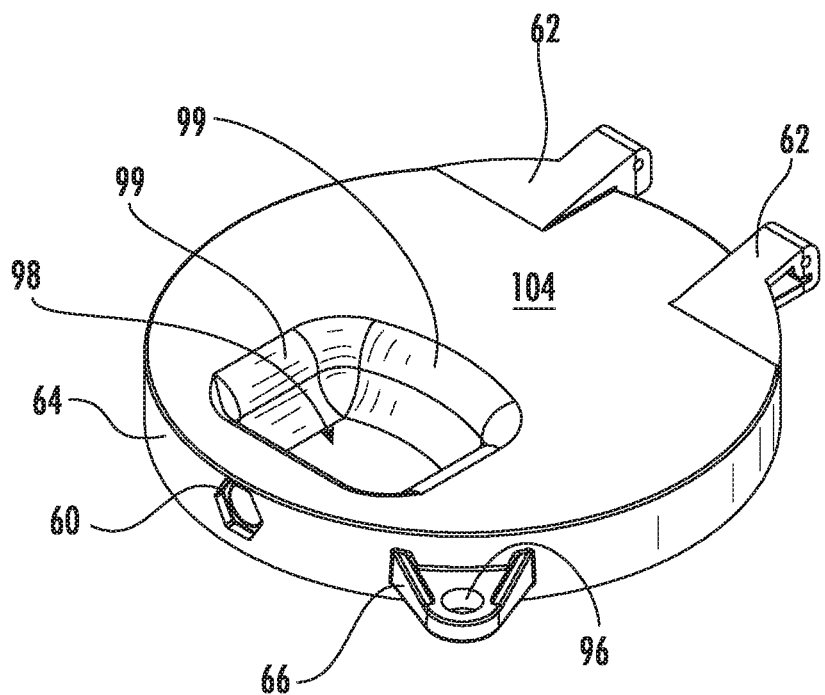
FIG. 13 is a perspective view of the top portion of the single-hand openable dump valve according to an aspect of the present disclosure.

As shown in FIGS. 1-10, the cyclonic separator 10 of the present disclosure may be constructed of two injected molded portions that form a first side 12 and a second side 14, an air discharge pipe assembly 16 and a single-hand openable dump valve 22. The sides 12, 14 matingly engage one another to form a central body portion of the cyclonic separator 10. The sides are typically held together by a series of fasteners such as screws, but could conceivably be glued or otherwise held together with an adhesive. The use of an adhesive is less preferred because it does not allow ready access to the interior of the separator should access be required for some reason. The body of the cyclonic separator engages the single-hand openable dump valve assembly 22 and the air discharge pipe assembly 16. The top portion of the air discharge pipe assembly is shown in FIG. 1 whereas the entirety of the air discharge pipe assembly is shown in FIGS. 5-6. The first side 12 and second side 14 matingly engage one another and form two tool holder mounts 24 on the front and back of the system as well as a collar 17. The collar 17 is reinforced with reinforcing supports 26 around the circumference of the collar, which like the rest of the central body portion are typically injection molded. The reinforcing supports are typically evenly spaced and typically a plurality of supports, more commonly at least four supports, are used. The first side 12 and second side 14 also employ first downward facing inlet 18 and second downward facing inlet 20 respectively. As shown in FIGS. 11-10, these two inlets each separately initially proceed in a vertical direction up the body of the vacuum separator and bend around in a generally L-shaped fashion around the circumference of the cyclonic separator such that air entering the inlets 18 and 20 enters the interior cavity of the cyclonic separator at two different locations such that the air travels within the interior of the cyclonic separator to form a cyclone of air/gas within the interior of the body. At the entrance point to the interior of the body the air is traveling in a substantially horizontal direction to form the cyclone or vortex of air in the interior of the system. The first downward facing inlet and second downward facing inlet each have a generally circular engagement portion, which may be threaded to engage corresponding threads on the end of the vacuum lines used by the user (see FIG. 4); however, conceivably the inlets could be rectangular or any other geometric shape. As air enters the system through the inlet the air and debris are immediately within the interior cavity of the separator. While not necessary, an optional conical debris separator 25 might be positioned within the interior cavity of the separator to prevent/wall-off/shield debris from being redeposited into the initial air intake pathway proximate the inlets 18, 20 (See FIG. 5B).

The air pathway, as discussed above, generally proceeds around the exterior of the unit such that it enters the interior of the cyclonic separator at a top portion of the unit in a manner sufficient to create a cyclone within the interior of the cyclonic separator. Along the exterior surface of the body and adjacent to the conduit delivering air from the inlets to the interior of the body of the unit, there are typically injection molded inlet pipe reinforcing sections 28 that provide support for the air pathway within. As shown in the figures, the molded inlet pipe reinforcing sections 28 are generally smooth and curved on the exterior and interior, but conceivably these portions could be of any shape. These molded reinforcement sections provide support for the air and particle intake pathway and, as with the rest of the unit, are typically made by injection molding plastic. The overall system may be of any color, but is typically black.

As shown in FIGS. 5 and 6, the air discharge assembly 16 typically includes four components, a discharge pipe coupling 30, an upper discharge pipe section 32, a lower discharge pipe section 34 and a chamfered discharge pipe coupler 36. The collar matingly engages the upper discharge pipe section and the lower discharge pipe section on opposite surfaces of an inwardly projecting lip and are typically frictionally held in place. The upper discharge pipe section is typically an about three inch pipe typically cut to about four and one half inches, whereas the lower discharge pipe section 34 is an about three inch pipe section typically cut to about five inches. The pipe section could conceivably be up to about five inches in diameter, but is typically about two to four inches, most typically about three inches in diameter. As shown in FIGS. 5-6, and 32-35, the chamfered discharge pipe coupler 36 is also typically the topmost pipe of the air discharge pipe assembly 16. The chamfered discharge pipe coupler typically has a lower portion 146 and an upper portion 144 and may have an interior diameter of from about 2.5-3.5 inches, more typically about three inches. The top of the upper discharge pipe section engages the bottom surface of the inward lip of the chamfered topmost discharge pipe coupler to frictionally fit and engage one another. The bottom of the chamfered discharge pipe coupler 36 is typically sized to abut the top of the collar 17 of the body of the cyclonic separator 10 as shown in FIG. 5.

The cyclonic separator also typically has a dump valve mating end 38, which frictionally engages the single-hand openable dump valve 22. As shown in FIGS. 11-31, the single-hand openable dump valve 22 is constructed of a variety of components. A feature of the present disclosure is the single-hand openable dump valve, which is positioned on the bottom of the cyclonic separator 10. The single-hand openable dump valve 22 enables a user of the cyclonic separator system to easily open and remove the large (denser) particles or items separated by the system with a single-hand when the system is suspended above the user or above ground. It can be opened and closed with one hand. The user will typically reach up to open the dump valve due to the cyclonic separator being positioned above the work area and may be release using one hand without the use of any tool(s). The valve is also able to be closed with a single hand without the use of any tool(s) and snap fit into the closed position using the spring actuated T-latch 50. The spring actuated T-latch 50 has two laterally extending side projections that may extend outwardly from the main center section of the T-latch, but may also be and are typically slightly curved to conform to and is configured to receive two fingers and allow a user to retract the main center section from engagement and release the T-latch while the spring within the spring actuated T-latch biases the latch outward and into an engaged position.

The dump valve mating end 38 of the body of the cyclonic separator typically has a dump valve receiving aperture 40. The dump valve receiving aperture 40 typically engages the dump valve collar 44. The single-hand openable dump valve 22 includes a top portion 42 and the dump valve collar 44. The dump valve collar 44 typically includes an upper section 46 and a lower section 48 (the bottom of the dump valve is shown facing upwardly in FIGS. 11-12, but the system is engaged in the bottom of the unit such that the top portion 42 faces downward).

Figure 24:
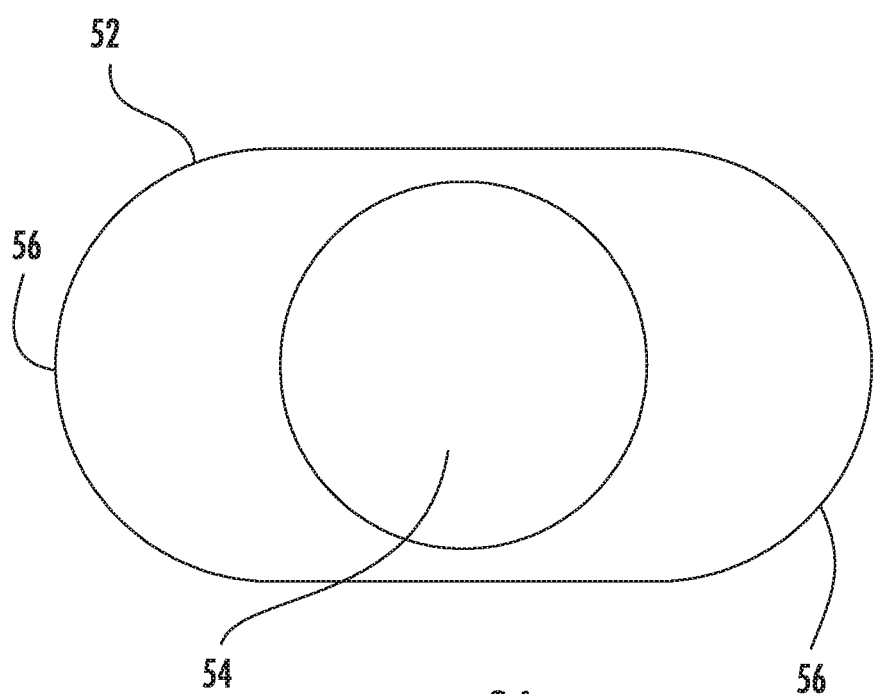
FIG. 24 is an elevated top view of the dump valve lid (latch) spacer.
Figure 25:
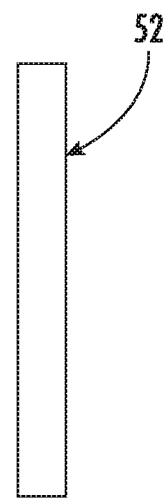
FIG. 25 is an elevated side view of the dump valve lid (latch) spacer shown in FIG. 24.
Figure 26:
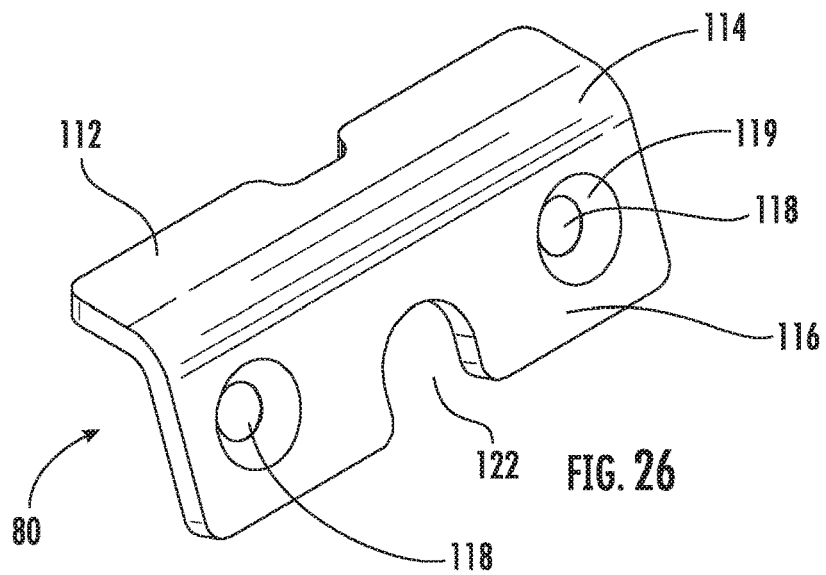
FIG. 26 is a perspective view of a latch striker typically employed in connection with the single-hand openable dump valve according to an aspect of the present disclosure.
Figure 27:
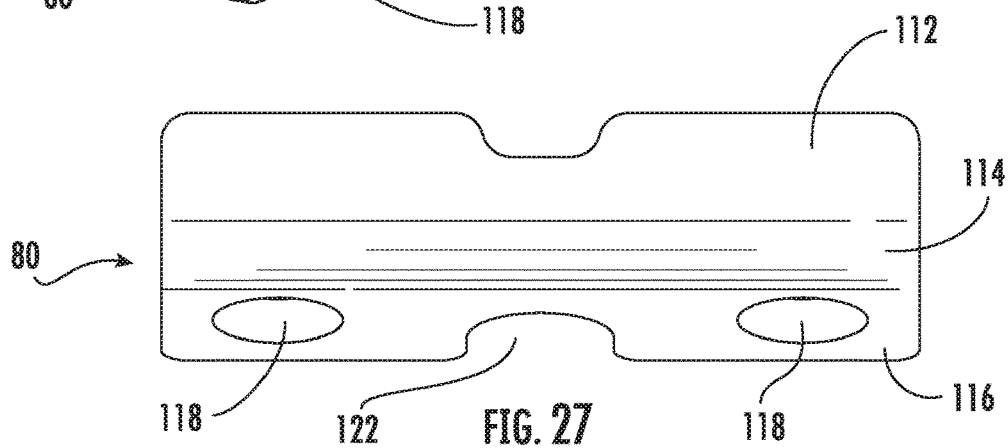
FIG. 27 is a top view of the latch striker shown in FIG. 26.
Figure 28:
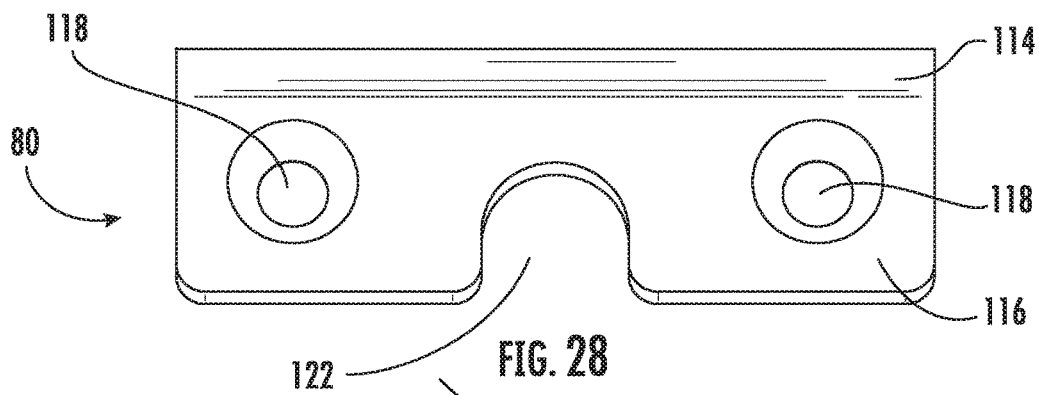
FIG. 28 is a front view of the latch striker shown in FIG. 26.
Figure 29:
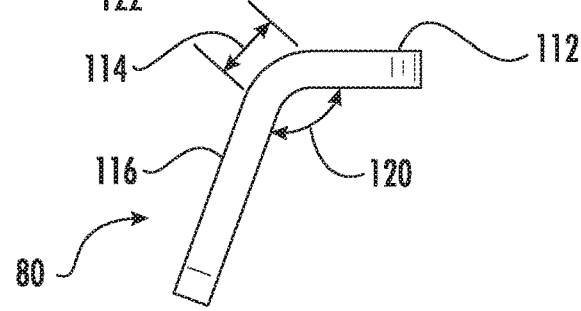
FIG. 29 is an elevated side view of the latch striker shown in FIG. 26.
Figure 31:
FIG. 31 is a side view of a dump valve lid gasket shown in FIG. 30.
Figure 30:
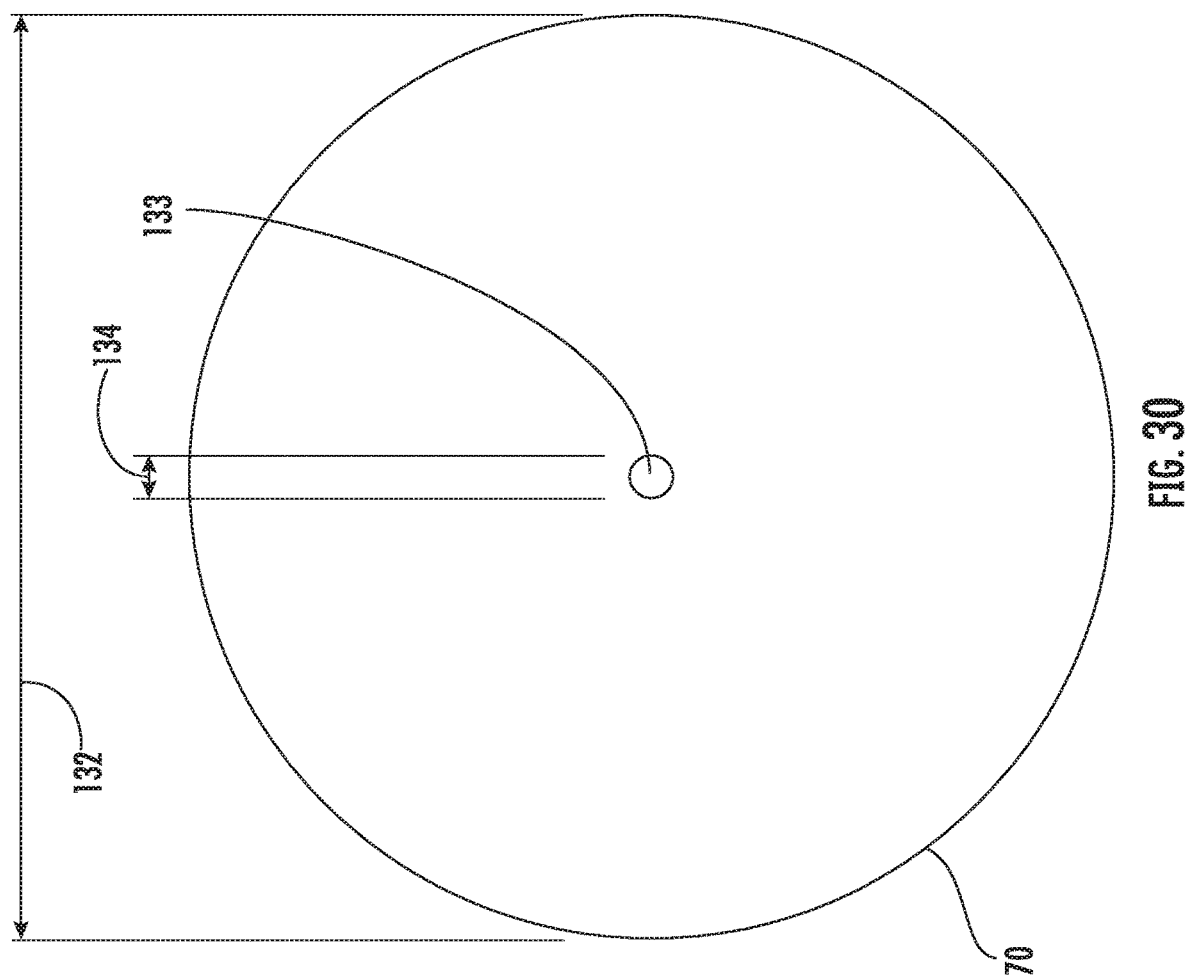
FIG. 30 is an elevated top view of the dump valve lid gasket.

As shown in at least FIGS. 11-17, the top portion typically includes the spring actuated valve T-latch 50, a dump valve lid spacer 52, which has a dump valve lid spacer aperture 54 and curved ends 56 (see FIGS. 24-25). A locking nut 58 is typically engaged within a locknut aperture 60 of a corresponding shape, which is typically hexagonal. Slopped mounting hinges 62 are positioned on one side of the top portion 42 and typically opposite the lid lock receiver 66. The top portion also has a side wall 64. The side wall 64 extends downward from the exterior surface of the top portion and is sized to fit within the dump valve collar 44 and engage the inwardly projecting lid of the dump valve collar 44. When closed, the lid lock receiver 66 of the top portion 42 aligns with the collar lock receiver 92 within a cut-out in the lower section 48 of the dump valve collar 44.

A dump valve lid gasket/seal 68 (see FIGS. 12 and 30-31) engages the bottom surface of the top portion 42. The dump valve lid gasket 68 typically has a thickness 130 of about 0.125 inch, but this thickness could be from about 0.1 to about 0.2 inch. Additionally, the center aperture 133 typically has a diameter of about 0.31 inch and the overall diameter 132 of the gasket 68 is typically about 6.63 inches. As will be appreciated, these dimensions may vary. The dump valve lid gasket is typically rubber or a rubber-like material. Conceivably any elastomeric polymer material capable of sealing the flow of air or other fluid out of the dump valve may be used.

Figure 14:
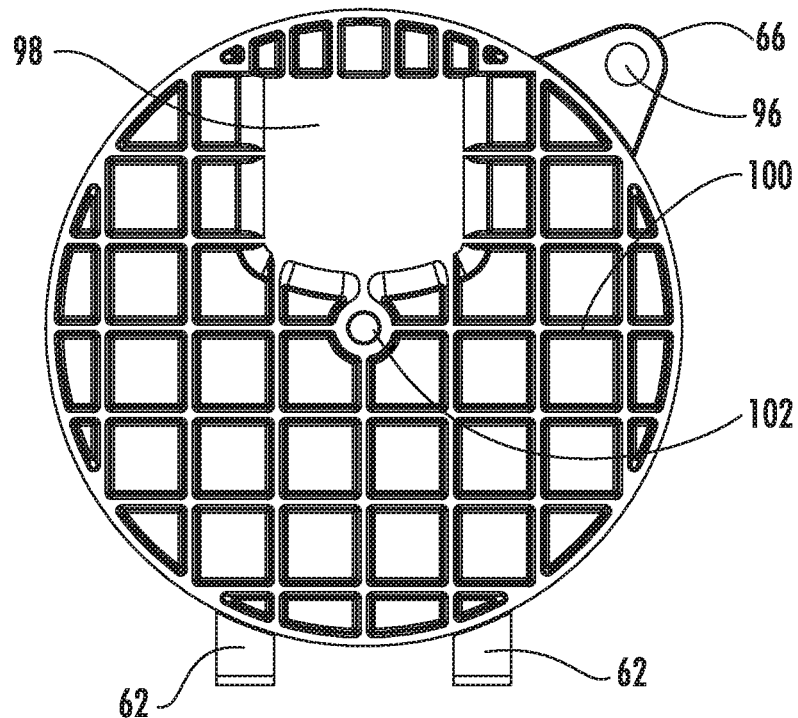
FIG. 14 is a bottom view of the top portion shown in FIG. 13.
Figure 15:
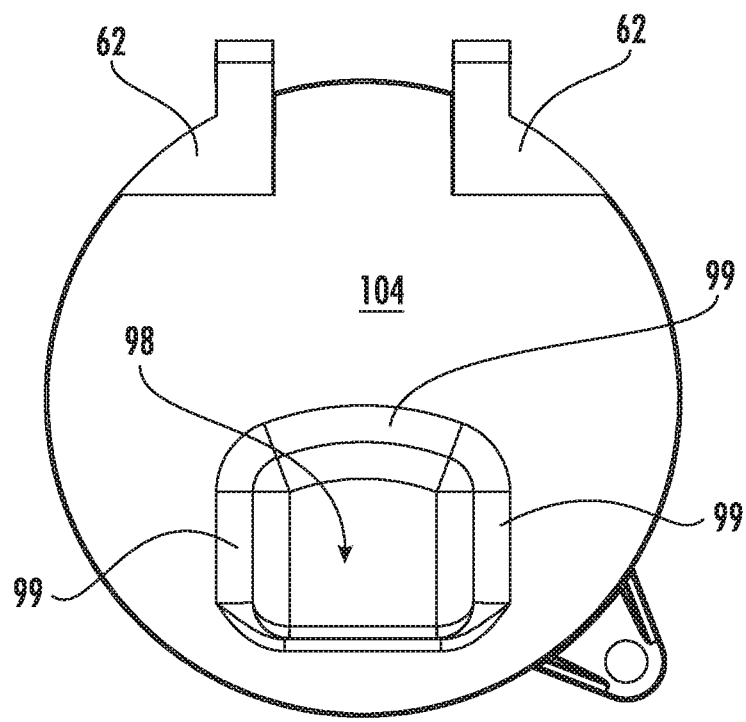
FIG. 15 is a top view of the top portion shown in FIG. 13.
Figure 16:
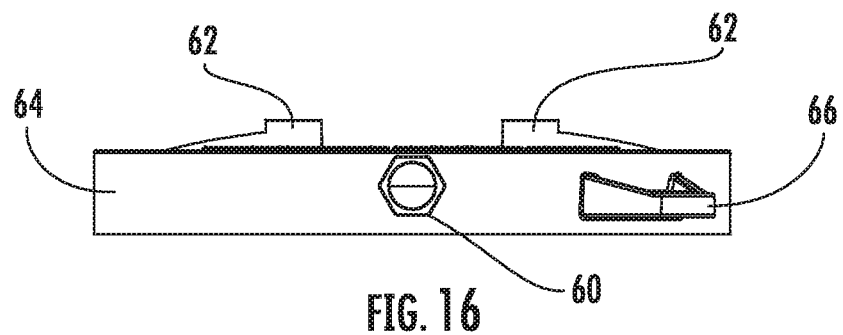
FIG. 16 is an elevated front view of the top portion shown in FIG. 13.
Figure 17:
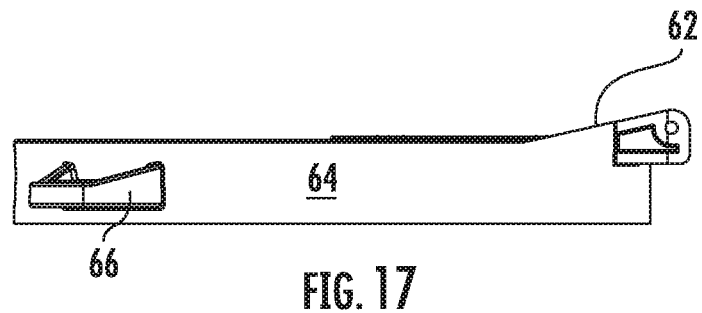
FIG. 17 is an elevated side view of the top portion shown in FIG. 13.

As shown in FIG. 12 and FIGS. 22-23, dump valve gasket retaining plate 70 engages the bottom surface of the dump valve lid gasket 68 using a flat washer 72 and lock washer 74, which are engaged by a vacuum sealed retaining screw 76, which engages molded threaded insert 102 (FIG. 14). The dump valve gasket retaining plate 70 is typically constructed of stainless steel. As shown in FIGS. 22-23, dump valve gasket retaining plate 70 has an overall diameter 73 of typically from about 4 inches to about 5 inches, more typically about 4.38 inches and an internal aperture 125 with an internal diameter that typically is from about 0.25-0.3 inch, most typically about 0.27 inch. The thickness 126 of the cap disk 68 is typically from about 0.06 to about 0.07 inch, most typically about 0.0625 inch. Again, these dimensions may be adjusted.

As shown in at least FIG. 12, striker retaining screws 78 engage and retain the striker 80 such that the striker is fixed to the dump valve collar 44 at the strike retaining projection 108. Corresponding hexagonal jam nuts 90 are utilized to facilitate this coupling/engagement.

Figure 18:
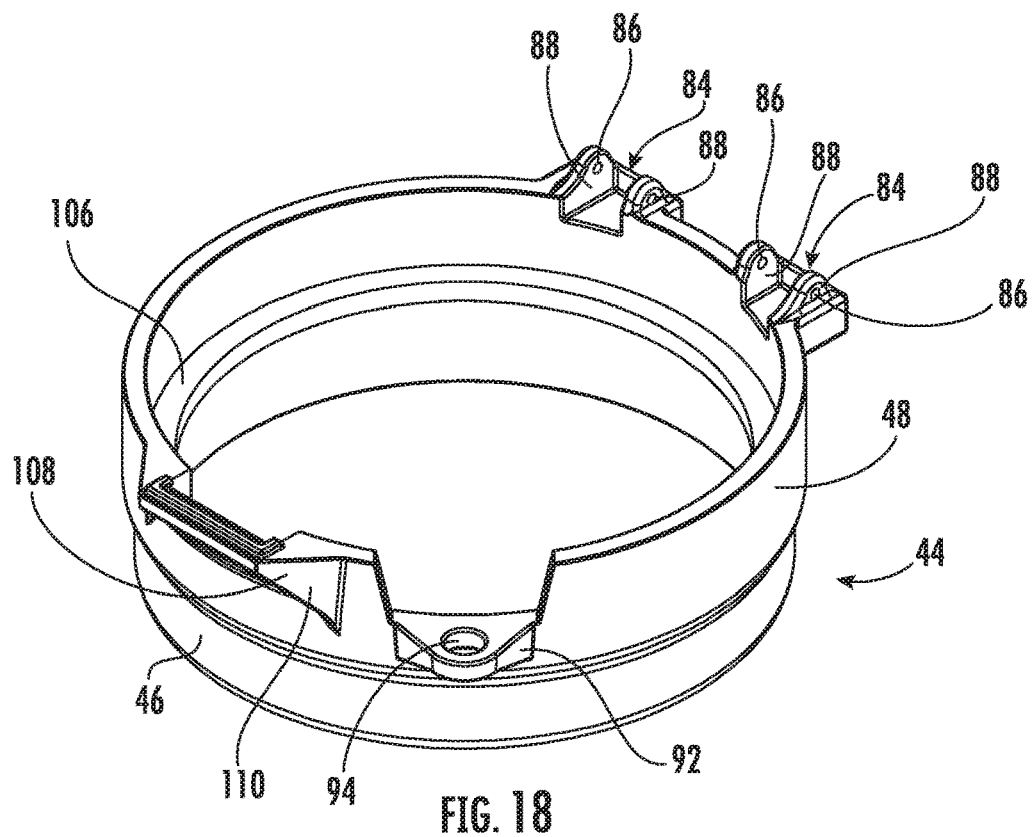
FIG. 18 is a perspective view of a dump valve collar according to an aspect of the present disclosure.
Figure 19:
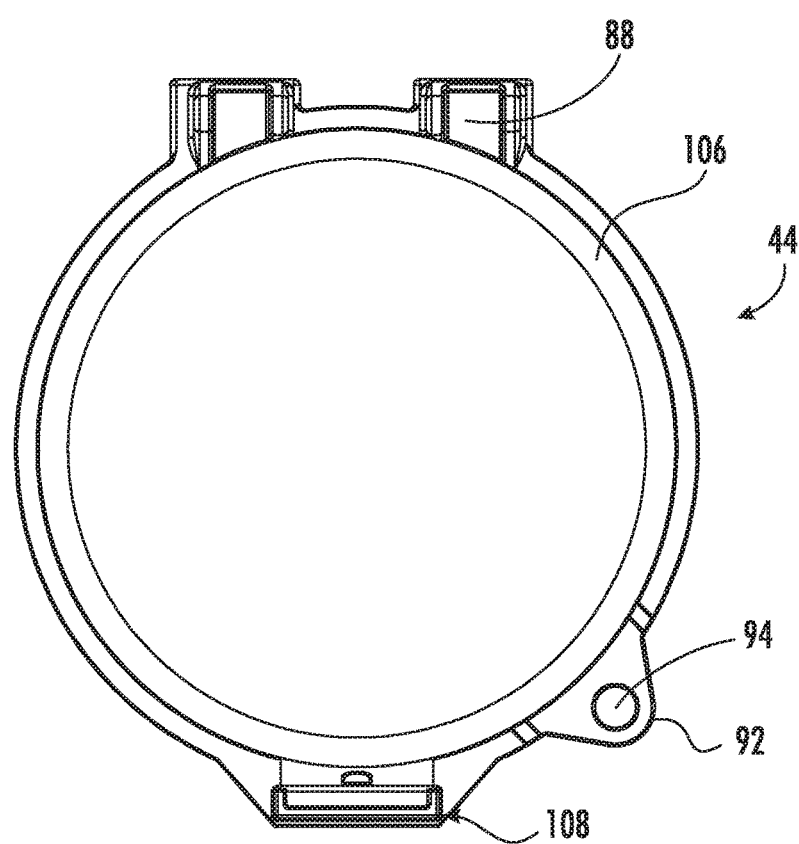
FIG. 19 is a top view of the dump valve collar shown in FIG. 18.
Figure 20:
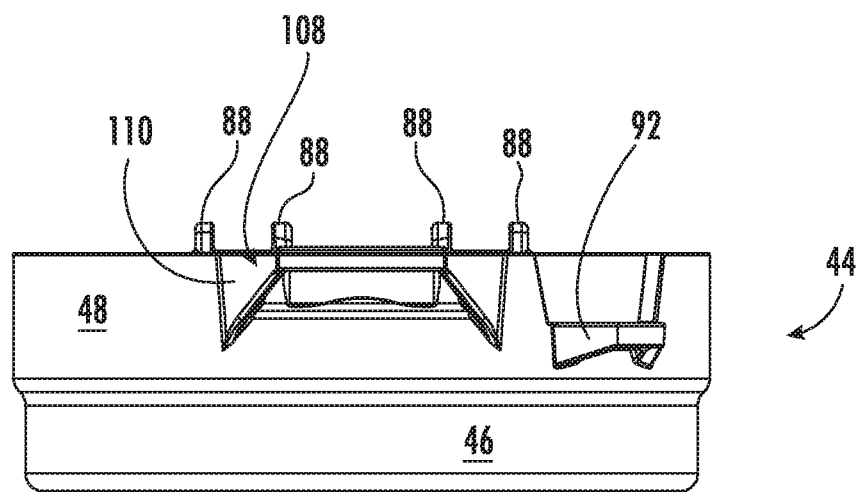
FIG. 20 is an elevated front view of a dump valve collar shown in FIG. 18.
Figure 21:
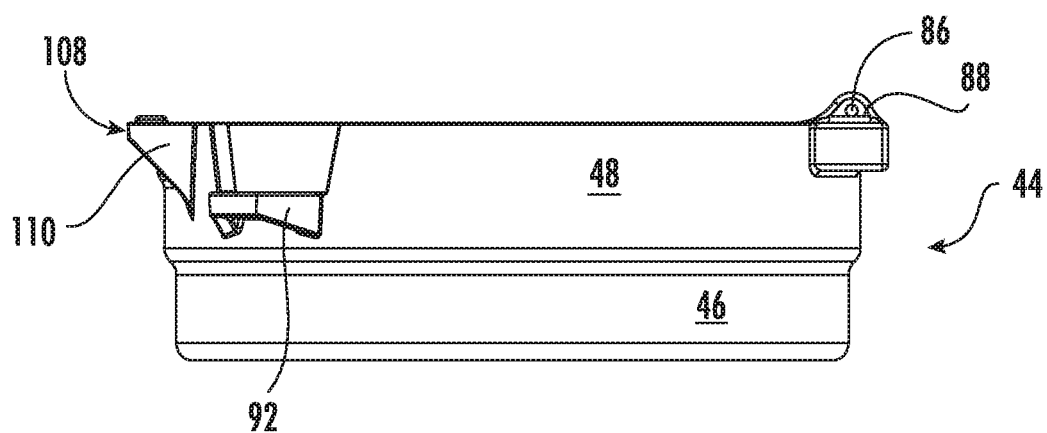
FIG. 21 is an elevated right side view of a dump valve collar shown in FIG. 18.

As shown in FIG. 12, hinge pins 82, which are typically stainless steel slotted spring pins, engage corresponding slots in the top portion 42 through hinge pin receiving apertures in the hinge mounts 84. The hinge pin receiving apertures are positioned within upwardly extending supports 88 (FIG. 18).

As discussed above, the dump valve collar 44 includes an outwardly projecting collar lock receiver 92, which has a collar lock receiver aperture 94 that substantially aligns with or precisely aligns with the aperture of the lid lock receiver 66. The lid lock receiving aperture 96 of the lid lock receiver 66. A lock (not shown) may be placed through these apertures to prevent an unauthorized user from opening the dump valve.

As shown in FIGS. 11-15, the top portion 42 typically includes a finger receiving aperture 98 having smooth curvilinear walls 99 designed to facilitate finger insertion into the finger receiving aperture such that a user's fingers can engage the outwardly extending T portions of the dump valve T-latch position therein easier.

As shown in FIG. 14, the bottom surface of the top portion typically has a lattice structure of reinforced injection molded grid walls 100 as well as a molded threaded insert 102, which holds the vacuum sealed dump valve lid gasket. The top portion 42 typically also has a generally planer top surface section 104.

A more detailed view of the dump valve collar 44 is shown in FIGS. 18-21. The collar 44 contains a strike retaining projection 108 extending away from the interior of the dump valve collar that utilizes angled reinforcing walls 110 extending in a generally triangular shape upward from the exterior of the side walls of the bottom of the lower section 48 of the dump valve collar 44. The dump valve collar 44 contains an inwardly projecting lip 106 (FIGS. 18-19), which engages the top portion 42 as well as the dump valve mating end 38 of the main body of the cyclonic separator 10.

As shown in FIGS. 26-29, the latch striker 80 includes a top surface 112, a bent or curved portion 114 and a screw mounting section 116. The screw mounting section 116 typically includes at least two striker retaining screw receiving apertures 118 that have been countersunk to have an angled side wall 119 such that the striker retaining screws are at least substantially flush with the screws mounting sections' surface when the striker retaining screws are installed. The screw mounting section also typically contains a dump valve T-latch receiving cut-out portion 122 which is generally U-shaped centered between the striker retaining screw receiving apertures 118. The bent or curved portion 114 is such that an angle 120 is typically greater than 90 degrees, most typically greater than about 110 degrees. The latch striker is typically made from metal such as steel, but conceivably could be a durable plastic material.

As shown in FIGS. 32-35, the discharge pipe coupler 36 is chamfered at the inside edge at about 45 degrees along the top perimeter. The chamfered edge 140 extends around the circumferential perimeter of the chamfered topmost discharge pipe coupler 36. The chamfered topmost discharge pipe coupler 36 further includes an inwardly projecting lip 142, upper interior wall surfaces 144 and lower interior wall surfaces 146. The inwardly projecting lip 144 has a top surface 148 and a bottom surface 150 which engage a discharge air receiving hose (not shown) and the upwardly projecting perimeter of the upper discharge pipe section 32 (see FIG. 5) respectively. The upper discharge pipe section 32 typically matingly engages the bottom surface 150 of the inwardly projecting lip 142. The chamfered topmost discharge pipe coupler 36 also has an outer wall surface 152.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vacuum cyclonic separator comprising:
a main body having a top surface with an air outlet, a bottom perimeter defining a bottom aperture of the main body, at least two downwardly facing air inlets and at least one side wall extending between the top surface and a bottom portion, an outside surface, an interior volume, and an air intake channel that extends from each of the at least two downwardly facing air inlets, partially upwardly along the main body and bends gradually in a curvilinear and substantially L-shaped path until the air intake channel directs air into the interior volume of the main body through an interior air inlet and in a direction that creates a cyclonic airflow within the interior volume of the main body and wherein the at least two downwardly facing air inlets are in at least substantially the same plane as the bottom perimeter of the main body and the interior air inlet is not in at least substantially the same plane as the bottom perimeter of the main body; and
a dump valve assembly operably engaged with the bottom aperture of the main body and wherein the dump valve assembly opens and closes with one hand and without the use of tools and wherein the dump valve assembly is engaged with the bottom portion and an at least substantially air-tight seal is on the bottom aperture of the main body when the dump valve assembly is in a closed position.

2. The vacuum cyclonic separator of claim 1, wherein vacuum cyclonic separator is free of any motor or air moving device and vacuum is provided by a vacuum system located remote from the vacuum cyclonic separator and connected to the vacuum system via the air outlet on the top of the cyclonic separator.

3. The vacuum cyclonic separator of claim 2 further comprising an air discharge assembly engaged to the air outlet of the main body such that the air discharge assembly routes air from within the interior volume of the main body outside of the vacuum cyclonic separator and into a discharge conduit that pulls the vacuum from the vacuum system.

4. The vacuum cyclonic separator of claim 1, wherein the main body comprises two separate halves matingly engaged with one another to form the main body and frictionally retained in position using an air discharge assembly and the dump valve assembly.

5. The vacuum cyclonic separator of claim 1 further comprising an air discharge assembly engaged to the air outlet of the main body such that the air discharge assembly routes air from within the interior volume of the main body outside of the vacuum cyclonic separator, wherein the air discharge assembly comprises a discharge pipe coupling positioned within the interior volume of the main body, wherein the discharge pipe coupling engages an upper pipe section that extends through the air outlet and above the top surface, and wherein a discharge pipe matingly engaging an exterior surface of the upper pipe section.

6. The vacuum cyclonic separator of claim 5, wherein the upper pipe section engages a bottom surface of an inwardly projecting lip on an interior surface of the discharge pipe and wherein a bottom lip of the discharge pipe engages the top surface of the main body.

7. The vacuum cyclonic separator of claim 6, wherein the discharge pipe coupling comprise an interior wall having an interior projecting lip with a projecting lip top surface and a projecting lip bottom surface and wherein the upper pipe section engages the top surface of the interior projection lip of the discharge pipe coupling.

8. The vacuum cyclonic separator of claim 7, wherein the air discharge assembly further comprises a downwardly extending discharge pipe engaged with the projecting lip bottom surface of the discharge pipe coupling and wherein the main body is generally conically-shaped and further comprises a collar extending upwardly from the top surface of the main body.

9. The vacuum cyclonic separator of claim 1, wherein the dump valve assembly further comprises a dump valve lid hingedly connected to a dump valve collar and wherein the main body further comprises a circular collar that extends upward from the top surface of the main body that defines the air outlet.

10. The vacuum cyclonic separator of claim 9, wherein the dump valve lid comprises a finger receiving aperture and at least one side wall having an aperture therein for receiving a retractable portion of a finger actuated latching mechanism.

11. The vacuum cyclonic separator of claim 10, wherein the finger actuated latching mechanism is a T-shaped, spring actuated latching mechanism comprises a left portion and a right portion extending away from a center section to form the T-shaped, spring actuated latching mechanism and positioned such that the left and right portions of the T-shaped, spring actuated latching mechanism are pulled by a user's fingers to open the dump valve collar.

12. The vacuum cyclonic separator of claim 11, wherein the dump valve assembly further comprises a dump valve collar having an upper portion and a lower portion separated by an inwardly projecting lip and wherein the inwardly projecting lip has a top surface that engages the perimeter of a bottom of the at least one side wall such that the dump valve lid is positioned within the dump valve collar when the dump valve lid is closed.

13. The vacuum cyclonic separator of claim 12, wherein the dump valve lid further comprises a molded threaded insert and a gasket having a center aperture and wherein the gasket is engaged to a bottom surface of the dump valve lid via a fastener and wherein the vacuum cyclonic separator further comprises an air discharge assembly engaged to the air outlet of the main body such that the air discharge assembly routes air from within the interior volume of the main body outside of the vacuum cyclonic separator and into a discharge conduit or open air above the vacuum cyclonic separator and wherein the air discharge assembly comprises: a discharge pipe coupling, an upper discharge pipe section, a lower discharge pipe section and a chamfered discharge pipe coupler and wherein an air discharge collar of the main body matingly engages the upper discharge pipe section and the lower discharge pipe section on opposite surfaces of an inwardly projecting lip and are frictionally held in place when the vacuum cyclonic separator is assembled.

14. A vacuum cyclonic separator comprising:
a main body having a top surface with an air outlet defined by an air discharge collar extending upward from the top surface of the main body, a bottom perimeter defining a bottom aperture of the main body, at least two downwardly facing air inlets and at least one side wall extending between the top surface and a bottom portion and shaped such that air received within an interior volume of the main body moves in a cyclone and wherein the at least two downwardly facing air inlets are in at least substantially the same plane as the bottom perimeter of the main body and wherein an air intake channel extends from each of the at least two downwardly facing air inlets, partially upwardly along the main body and bends gradually in a curvilinear and substantially L-shaped path until the air intake channel directs air into the interior volume of the main body through an interior air inlet and in a direction that creates a cyclonic airflow within an interior volume of the main body;
a dump valve assembly capable of being opened and closed with one hand where the dump valve assembly is engaged with the bottom portion to seal the bottom aperture of the main body; and
an air discharge assembly engaged to the air outlet of the main body such that the air discharge assembly routes air from within the interior volume of the main body outside of the vacuum cyclonic separator and into a discharge conduit or open air above the vacuum cyclonic separator and wherein the air discharge assembly comprises: a discharge pipe coupling, an upper discharge pipe section, a lower discharge pipe section and a chamfered discharge pipe coupler and wherein the air discharge collar of the main body matingly engages the upper discharge pipe section and the lower discharge pipe section on opposite surfaces of an inwardly projecting lip and are frictionally held in place when the vacuum cyclonic separator is assembled.

15. The vacuum cyclonic separator of claim 14, wherein the dump valve assembly further comprises a dump valve lid hingedly connected to a dump valve collar and wherein the air discharge collar is circular and has a circumference and a plurality of reinforcing supports are spaced around the circumference of the air discharge collar and the main body comprises two halves that are each injection molded and matingly engage one another to form the main body when the halves are engaged with one another.

16. The vacuum cyclonic separator of claim 15, wherein the dump valve lid comprises a finger receiving aperture and at least one side wall having an aperture therein for receiving a retractable portion of a finger actuated latching mechanism.

17. The vacuum cyclonic separator of claim 16, wherein the finger actuated latching mechanism is a T-shaped, spring actuated latching mechanism having a left portion and a right portion where the left portion and the right portion of the T-shaped, spring actuated latching mechanism are each pulled by a user's fingers to open the dump valve collar.

18. The vacuum cyclonic separator of claim 17, wherein the dump valve assembly further comprises a dump valve collar having an upper portion and a lower portion separated by an inwardly projecting lip and wherein the inwardly projecting lip has a top surface that engages the perimeter of a bottom of the at least one side wall such that the dump valve lid is positioned within the dump valve collar when the dump valve lid is closed.

19. The vacuum cyclonic separator of claim 18, wherein the dump valve lid further comprises a molded threaded insert and a gasket having a center aperture is engaged to a bottom surface of the dump valve lid via a fastener and wherein the at least two downwardly facing air inlets are threaded.

20. A vacuum cyclonic separator comprising:
- a main body having a top surface with an air outlet defined by an air discharge collar extending upward from the top surface of the main body, a bottom perimeter defining a bottom aperture of the main body, at least two downwardly facing and threaded air inlets and at least one side wall extending between the top surface and a bottom portion and shaped such that air received within an interior cavity of the main body moves in a cyclone and wherein the at least two downwardly facing and threaded air inlets are in at least substantially the same plane as the bottom perimeter of the main body and wherein an air intake channel extends from each of the at least two downwardly facing air inlets, partially upwardly along the main body and bends gradually in a curvilinear and substantially L-shaped path until the air intake channel directs air into the interior cavity of the main body through an interior air inlet and in a direction that creates a cyclonic airflow within an interior cavity of the main body;
- a dump valve assembly capable of being opened and closed with one hand where the dump valve assembly is engaged with the bottom portion to seal the bottom aperture of the main body;
- an air discharge assembly engaged to the air outlet of the main body such that the air discharge assembly routes air from within the interior cavity of the main body outside of the vacuum cyclonic separator and into a discharge conduit or open air above the vacuum cyclonic separator and wherein the air discharge assembly comprises: a discharge pipe coupling, an upper discharge pipe section, a lower discharge pipe section and a chamfered discharge pipe coupler and wherein the air discharge collar of the main body matingly engages the upper discharge pipe section and the lower discharge pipe section on opposite surfaces of an inwardly projecting lip and are frictionally held in place when the vacuum cyclonic separator is assembled;
- a threaded vacuum line that is engaged with at least one of the at least two downwardly facing and threaded air inlets; and
- wherein a remotely located vacuum source is provided by a motorized vacuum system located remote from the vacuum cyclonic separator and operatively connected with the air outlet of the vacuum cyclonic separator via at least one air connection pipe and wherein the vacuum cyclonic separator is free of any motor or air moving device within the main body.

* * * * *